United States Patent [19]

Moses, Jr.

[11] 4,423,791

[45] Jan. 3, 1984

[54] METHOD OF INHIBITING DIFFERENTIAL WALL STICKING IN THE ROTARY DRILLING OF HYDROCARBON WELLS

[76] Inventor: Edward L. Moses, Jr., 1775 Saint James Pl., Suite 300, Houston, Tex. 77056

[21] Appl. No.: 341,279

[22] Filed: Jan. 21, 1982

[51] Int. Cl.$^3$ .............................................. E21B 21/00
[52] U.S. Cl. .................................... 175/65; 252/8.5 R
[58] Field of Search .............. 175/65, 66; 252/8.55 R, 252/8.5 R, 8.5 LC, 8.5 B

[56] References Cited

U.S. PATENT DOCUMENTS 3,242,032  3/1966  Schott ............................ 252/8.55 R Primary Examiner—Stephen J. Novosad
Assistant Examiner—Michael Starinsky
Attorney, Agent, or Firm—Guy E. Matthews

[57] ABSTRACT

A method of inhibiting the occurrence of differential wall sticking in the rotary drilling of hydrocarbon wells is provided. The yield point of the drilling fluid is measured and if necessary increased in a known manner to a minimum value computed from the weight of the drilling fluid so that solid, substantially spherical glass beads having a specific gravity between 2.4 and 2.65, a diameter between 9.84 and 187 mils, and a hardness of 5.5 Mohs placed therein will not settle, and 10 to 50 ppg of the glass beads are added to a quantity of the drilling fluid. A slug of the glass beads/drilling fluid mixture is then spotted in the well bore adjacent a previously identified zone of possible sticking, so that a substantial number of the glass beads may be deposited in the filter cake lining the well bore adjacent the zone of possible sticking. The presence of the glass beads inhibits the formation of a seal between a drill string, down hole tool or casing and the filter cake, which seal is necessary for the occurrence of differential wall sticking. In an alternative method, the glass beads/drilling fluid mixture is pumped into the well bore without identifying zones of possible sticking.

5 Claims, No Drawings

METHOD OF INHIBITING DIFFERENTIAL WALL STICKING IN THE ROTARY DRILLING OF HYDROCARBON WELLS

BACKGROUND OF THE INVENTION

This invention relates generally to the field of rotary well drilling and more particularly concerns a method of inhibiting the occurrence of differential wall sticking in the rotary drilling of hydrocarbon wells.

In the rotary drilling of hydrocarbon wells, a string of drill pipe having a drill bit mounted on the lower end thereof is rotated to cause the bit to make the hole. Drilling fluid is circulated down through the hollow drill string, emerging through the bit and returning to the surface through the annular space between the drill string and the wall of the bore hole. Such rotation of the drill string and circulation of the drilling fluid are substantially continuous while drilling, being interrupted for essential operations such as adding an additional section of drill pipe to the top of the drill string or when the entire drill string is disassembled and pulled from the well bore. Periodically during interruptions in the drilling operation and also at its conclusion, downhole tools such as logging tools are inserted into the bore and subsequently recovered, and casing is inserted into the bore and set.

Differential wall sticking may occur when the drill string, downhole tool, or casing is allowed to stand motionless lying directly against a permeable formation in the presence of a drilling fluid pressure gradient greater than the fluid pressure gradient of the permeable formation. In almost all rotary drilling, the drilling fluid weight is such that a substantial pressure differential is carried between the drilling fluid and the formation fluid to restrain formation flows. During drilling operations, this pressure gradient differential causes the drilling fluid liquids to flow from the bore hole into the permeable formation, depositing a filter cake composed of the drilling fluid solids on the bore wall. When rotation and circulation cease with the drill string lying against the bore wall, the fluid pressure differential continues to build the filter cake on either side of the drill string. On occasion, this filter cake forms a seal along the side of the drill string adjacent the bore wall, preventing the application of the drilling fluid pressure gradient to this embedded side of the drill string. The likelihood of such a seal forming is increased if the rotating drill string has previously eroded a vertical groove in the filter cake or bore wall and the drill string is lying motionless in that groove. Instead, the drilling fluid pressure gradient acting on the exposed opposite side of the drill string is opposed only by the formation fluid pressure gradient, resulting in a net force equal to the fluid pressure differential applied over the embedded area of the drill string which is sealed from the drilling fluid. This net force holds the drill string against the filter cake. The force required to push, pull or rotate the drill string is this net force times the coefficient of friction between the filter cake and the drill string. This condition is called differential wall sticking, and may also occur while running down hole tools and casing.

The currently favored practice of freeing stuck drill strings, down hole tools, and casing is to first reestablish circulation of the drilling fluid down the drill string and up the annulus. Then, extreme pressure lubricants or wetting agents, with or without oil, are added to the drilling fluid. The drilling fluid/formation fluid pressure differential continues to force the drilling fluid liquids through the filter cake into the permeable formation, allowing these lubricants or agents to infiltrate the filter cake. They either reduce the coefficient of friction between the filter cake and the drill string or they break down the seal between them, allowing the higher drilling fluid pressure gradient to be applied to the side of the drill string embedded in the filter cake, thereby reducing the force necessary to free the stuck drill string. This method, however, does not inhibit the occurrence or reoccurrence of the differential wall sticking.

Rayborn, U.S. Pat. No. 4,063,603, discloses a method of adding lightweight plastic beads to the drilling fluid to create a ball-bearing effect and reduce the torque, drag and wear on the casing and drill string. The plastic beads are relatively soft; therefore they can deform under pressure and can be more easily abraded. Their relative softness also prevents any plastic beads embedded in the filter cake from inhibiting the erosion of a vertical groove in the filter cake or bore wall. Their low specific gravity causes them to float unless used in lightweight drilling fluid, which is generally unsuited to the high downhole temperatures found in deeper wells. The plastic beads themselves soften at high temperatures, thereby restricting their use.

The minute glass bead drilling fluid lubricant disclosed by Dodd, U.S. Pat. No. 4,123,367, is not intended to and does not solve the problem of differential wall sticking. Dodd uses glass beads having a particle size of 1.73 to 3.46 mils (44 to 88 microns) or approximately 170 to 325 U.S.A. Sieve Series mesh screens. They are added to the circulating drilling fluid in concentrations of 2-8 pounds per barrel to reduce rotating torque and drag. They are far too small to inhibit the formation of a seal between the drill string and the formation.

Therefore it is an object of this invention to provide a method of inhibiting the occurrence of differential wall sticking.

It is a further object of this invention to provide a method of reducing the severity of any differential wall sticking which does occur.

It is a further object of this invention to provide a method of treating individual zones of possible sticking to inhibit the occurrence of differential wall sticking in that zone.

It is a further object of this invention to provide a method of embedding glass beads in the filter cake formed at a zone of possible differential wall sticking to reduce the ability of the filter cake to form a seal with the drill string.

SUMMARY OF THE INVENTION

A method of inhibiting the occurrence of differential wall sticking in the rotary drilling of hydrocarbon wells is provided. The yield point of the drilling fluid is measured and if necessary increased in a known manner to a minimum value computed from the weight of the drilling fluid so that solid, substantially spherical glass beads having a specific gravity between 2.4 and 2.65, a diameter between 9.84 and 187 mils, and a hardness of 5.5 Mohs placed therein will not settle, and 10 to 50 ppg of the glass beads are added to a quantity of the drilling fluid. A slug of the glass beads/drilling fluid mixture is then spotted in the well bore adjacent a previously identified zone of possible sticking, so that a substantial number of the glass beads may be deposited in the filter cake lining the well bore adjacent the zone of possible sticking. The presence of the glass beads inhibits the formation of a seal between a drill string, down hole tool or casing and the filter cake, which seal is necessary for the occurrence of differential wall sticking. In an alternative method, the glass beads/drilling fluid mixture is pumped into the well bore without identifying zones of possible sticking.

DETAILED DESCRIPTION OF THE INVENTION

Differential wall sticking is most likely to occur in the rotary drilling of a hydrocarbon well where the bore hole passes through a permeable formation with a formation fluid pressure substantially less than the drilling fluid pressure at that depth. This condition leads to a rapid buildup on the bore wall of a filter cake composed of drilling fluid solids, as the fluid pressure differential forces the drilling fluid liquids from the bore hole into the formation. The permeability of the formation allows the drilling fluid liquids to drain away from the bore hole without significantly increasing the formation pressure, so that the filter cake buildup in these areas is continuous. The permeability of the formation allows the filter cake to build up rapidly around the drill string when the rotation and circulation are momentarily halted with the drill string lying motionless against the bore wall. As the filter cake builds up, liquid flow from the bore hole into the formation is reduced by the thickness of the filter cake. The pressure drop from the drilling fluid pressure of the bore hole to the formation fluid pressure of the formation occurs across the filter cake. At points within the filter cake between the inner and outer surfaces thereof, the pressure is intermediate those of the bore hole and the formation.

When a bore hole is drilled through a permeable formation with a substantially lower formation fluid pressure, the formation is a zone of possible differential wall sticking. Often, the occurrence of differential wall sticking during the previous drilling of adjacent wells will identify these zones before a new well is begun. Additionally, production of a hydrocarbon-bearing formation by adjacent wells can lower the fluid pressure of that formation, creating a zone of potential wall sticking. At other times, the zones may be identified during the drilling of the present well by the occurrence of differential wall sticking. In any case, once a zone of possible sticking has been located, the method of the current invention may be used to inhibit differential wall sticking at that zone of the drill string, casing, and any downhole tools used in the open bore hole.

The preferred material for use with the method of the present invention is solid, substantially spherical glass beads having a specific gravity between 2.4 and 2.65, a hardness of 5.5 Mohs, and a diameter between 9.84 and 187 mils, the sizes of the openings in U.S.A. Sieve Series 4 and 60. Preferably, the glass beads are devoid of gas inclusions and are composed of chemically resistant, high grade crown glass of the lime soda type with a silica content greater than 67 percent.

In the method of the present invention, the weight and the yield point of the drilling fluid in use in the well are measured. It has been found that if the yield point is too low, the glass beads have a tendency to settle out. It has been found that there is a numerical relationship between the weight of the drilling fluid, measured in pounds per gallon, and the minimum yield point of the drilling fluid, measured in pounds per 100 square feet, which will reduce the tendency of the glass beads to settle out. The measured numerical value of the yield point must not be more than four integers less than the numerical value of the weight. If this requirement is not satisfied by the initial measurements of the drilling fluid, the yield point must be increased in a known manner, such as by adding bentonite clay, until the relationship is satisfied.

The glass beads are then added to a quantity of drilling fluid. The preferred concentration of the glass beads is from 10 to 50 pounds per barrel of drilling fluid. This glass bead/drilling fluid mixture is spotted in the bore hole adjacent a zone of possible sticking by pumping a slug of the mixture through the drill string and displacing it into the open well bore adjacent the zone. The flow of the drilling fluid liquids into the permeable formation of the zone of possible sticking embeds the drilling fluid solids, including the glass beads, in the filter cake lining the open well bore adjacent the zone. Although the exact mode of operation of the glass beads in inhibiting the occurrence of differential wall sticking is not known, it is thought that their presence in the filter cake inhibits the formation of a seal between the filter cake and the drill string. Such a seal is necessary or the occurrence of differential wall sticking, as the seal prevents the higher drilling fluid pressure from reaching and acting upon that portion of the drill string embedded in the filter cake. It is also thought that the presence of the hard glass beads in the filter cake with their smooth, spherical surfaces inhibits the formation of vertical grooves in the filter cake and bore wall.

In an alternative method of this invention, a quantity of the glass beads/drilling fluid mixture is pumped into the open bore hole without first identifying the zones of possible sticking. The glass beads will embed themselves in the filter cake throughout the bore of the open hole. The flow of the drilling fluid liquids from the bore hole into the surrounding formations, and therefore the filter cake buildup of the drilling fluid solids, is greatest in the zones of possible sticking because of the porosity and the low fluid pressure of those formations. Therefore, the glass beads will be concentrated in the filter cake adjacent the zones of possible sticking, where they will be most effective in inhibiting the occurrence of differential wall sticking.

The method of this invention has several distinct advantages over the current methods of dealing with the problem of differential wall sticking. This method inhibits the occurrence of the problem whereas the currently preferred method only acts to remedy the problem after it has occurred. The glass beads are inert, and do not affect the properties of either water of oil base drilling fluids. Unlike plastic beads, they are unaffected by bottom hole temperatures up to 730° C. They will not float, but when properly used, remain suspended in a viscosified fluid.

The hardness of the glass beads prevents them from being worn down by the rotation of the steel drill string against them. Their non abrasive spherical shape reduces any wear or damage to the drill string. The inert beads will not decompose in the presence of caustic chemicals.

The method of this invention also acts to reduce the severity of differential wall sticking on those occasions when it does occur. The beads are thought to minimize the area of embedded drill string sealed from the well bore by the filter cake, thereby reducing the force required to free the stuck drill string. Since the glass beads are inert, any of the currently preferred methods for freeing a stuck drill string may be used in conjunction with the glass beads without ill effect.

The usefulness and practicality of this invention are illustrated in the following examples of a laboratory test and of experimental field tests wherein the method of this invention was used to inhibit the occurrence of differential wall sticking in the rotary drilling of hydrocarbon wells.

EXAMPLE 1: LABORATORY ANALYSIS AND TEST

This laboratory test was conducted to obtain empirical data demonstrating the ability of the method of the present invention to inhibit differential wall sticking. A hollow core of a high porosity material was mounted in the center of a cylinder. Test drilling fluid was circulated through the center of the core while a vacuum was applied to the sides of the core. The vacuum caused a filter cake to build within the core proportional to the dynamic fluid loss of the drilling fluid through the permeable core. Once the filter cake was formed, a drilling collar simulator was placed in the center of the core lying against the filter cake. The drilling fluid was circulated and after a constant interval the drilling collar was pulled free. The amount of pull required was recorded in pounds for each type of drilling fluid system tested.

Base drilling mud A was a seawater/lignosulfonate mud weighing 14 pounds per gallon and having an API fluid loss of 10.0 cc. Without the glass beads of the method of the present invention, a pull of 10 pounds $\pm \frac{1}{2}$ pound was required to free the stuck drilling collar simulator. When 20 pounds per barrel of the glass beads were added to the same base mud A, a pull of 6 to 8 lbs. $\pm \frac{1}{2}$ lb. was required. When 30 ppb of the glass beads were added to the same base mud A, a pull of 4 lbs. $\pm \frac{1}{2}$ lb. was required. Finally, when 40 ppb of glass beads were added to the same base mud A, 0 lbs. pull was required to free the drilling collar simulator.

The same test was conducted with a different base drilling mud B, which was a seawater/polymer hydrated bentonite mud weighing 11.5 ppg and having an API fluid loss of 52.0 cc. Without the glass beads of the method of the present invention in the base mud B, a pull of 48 lbs. $\pm \frac{1}{2}$ lb. was required to free the drilling collar simulator. When 20 ppb of glass beads were added to the same base mud B, a pull of 45 lbs. $\pm \frac{1}{2}$ lb. was required. Finally, when 40 ppb of the glass beads were added to the same base mud B, a pull of 32 lbs. $\pm \frac{1}{2}$ lb. was required to free the drilling collar simulator.

EXAMPLE 2

An experimental field test was conducted in the Gueydan area of southern Louisiana. The mud was a fresh water/lignosulfonate mud weighing 18 ppg. The target depth of 15,002 feet was reached with 2,254 feet of $5\frac{7}{8}''$ diameter open hole. Deviation was from 4° to 17°. At the target depth, severe hole problems were encountered when the drill string was stuck twice while circulating to condition the mud. Oil mud was spotted twice and the drill string came free after $26\frac{1}{2}$ hours and 15 hours, respectively. The oil mud was circulated out and the base mud reconditioned. 50 barrels of base mud were placed in the slugging pit and mixed with 40 ppb of glass beads. The 50 bbl. slug was displaced and spotted in the open hole at the suspected location of the zone of potential sticking and the drill string was pulled out of the hole without a pause to log. After running sonic and gamma ray logs and a dipmeter survey, the drilling mud was circulated and conditioned with a 40 ppb glass bead slug spotted in the open hole. 2,254' of 5" flush joint liner were run in and cemented in the $5\frac{7}{8}''$ diameter hole with no problems encountered. The spotting of the glass beads improved the condition of the hole, thereby expediting the logging and placement of the 5" diameter liner without further problems.

EXAMPLE 3

An experimental field test was conducted in south Louisiana. The mud was a fresh water/lignosulfonate mud weighing 18.4 ppg. The target depth was 15,000' with a hole size of $5\frac{7}{8}''$ diameter. While drilling at 13,600', the drill pipe twisted off at 13,000'. The drill pipe could not be jarred free. Washing over was commenced with a 5" diameter wash-over pipe. Periodically, the wash over pipe was slugged with a glass bead/drilling fluid mixture to ensure good hole condition. After washing over 400', the jars were twisted off at 13,000'. The hole was reentered with an overshot, which latched onto the fish. The well kicked, showing 5,000 psi on the blowout preventer. The well was killed after 5 days. The wash-over pipe was free and pulled out of the hole.

Thus it is apparent that there has been provided, in accordance with the invention, a method of inhibiting the occurence of differential wall sticking in the rotary drilling of hydrocarbon wells that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications, and variations as fall within the spirit and broad scope of the appended claims.

What is claimed is:

1. A method of inhibiting differential wall sticking of a down hole apparatus in the rotary drilling of an open well bore having a drilling fluid therein, comprising:
   measuring the weight of the drilling fluid in pounds per gallon and measuring the yield point of the drilling fluid in pound per 100 square feet and if necessary increasing the yield point so that its measured numerical value is not more than four integers less than the numerical value of the weight;
   mixing 10 to 50 ppb of the glass beads into the separate drilling fluid, the glass beads being solid and substantially spherical, having a specific gravity between 2.4 and 2.65, a diameter between 9.84 and 187 mils, and a hardness of 5.5 Mohs; and
   pumping a slug of the glass beads/drilling fluid mixture into the open well bore.

2. The method of claim 1 wherein a zone of possible differential wall sticking has been identified in the open well bore and wherein the step of pumping a slug of the glass beads/drilling fluid mixture into the open well bore comprises: spotting the glass beads/drilling fluid mixture adjacent the zone the possible sticking by pumping a slug of the mixture through the drill string into the open well bore and depositing the slug adjacent the zone of possible sticking, so that a substantial number of the glass beads may be deposited in filter cake lining the open well bore adjacent the zone of possible sticking, so that a seal between the drill string, the casing, and the down hole tool and the filter cake is less readily formed.

3. The method of claim 1, wherein the glass beads are made of soda/lime glass and have a silica content greater then 67 percent.

4. The method of claim 1, wherein the slug of the glass beads/drilling fluid mixture is pumped into the open well bore through the drill string.

5. The method of claim 4, wherein the slug of the glass beads/drilling fluid mixture is pumped into the open well bore through the drill string during normal drilling operations.

* * * * *

UNITED STATES PATENT AND TRADEMARK OFFICE
CERTIFICATE OF CORRECTION

PATENT NO. : 4,423,791
DATED : January 3, 1984
INVENTOR(S) : Edward L. Moses, Jr.

It is certified that error appears in the above-indentified patent and that said Letters Patent is hereby corrected as shown below:

ON THE TITLE PAGE:

[76] Inventor: change, "Edward L. Moses, Jr., 1775 Saint James Pl., Suite 300, Houston, Texas 77056" to --Anita Dodd Lammons, 1422 Bowsprit, Willis, Texas 77378--.

Signed and Sealed this

Second Day of September, 1997

Attest:

BRUCE LEHMAN

Attesting Officer

Commissioner of Patents and Trademarks